United States Patent
Peeters

(10) Patent No.: US 10,827,723 B2
(45) Date of Patent: Nov. 10, 2020

(54) MIXING WAGON

(71) Applicant: Peeters Landbouwmachines B.V., Etten-leur (NL)

(72) Inventor: Daniel Petrus Marie Peeters, Etten-leur (NL)

(73) Assignee: Peeters Landbouwmachines B.V., Etten-leur (NL)

( * ) Notice: Subject to any disclaimer, the term of this patent is extended or adjusted under 35 U.S.C. 154(b) by 242 days.

(21) Appl. No.: 15/769,181

(22) PCT Filed: Oct. 20, 2016

(86) PCT No.: PCT/NL2016/050719
§ 371 (c)(1),
(2) Date: Apr. 18, 2018

(87) PCT Pub. No.: WO2017/069621
PCT Pub. Date: Apr. 27, 2017

(65) Prior Publication Data
US 2018/0303060 A1 Oct. 25, 2018

(30) Foreign Application Priority Data

Oct. 23, 2015 (NL) .................................... 2015654
Apr. 22, 2016 (NL) .................................... 2016659

(51) Int. Cl.
*A01K 5/00* (2006.01)
*B01F 7/24* (2006.01)
(Continued)

(52) U.S. Cl.
CPC .......... *A01K 5/004* (2013.01); *A01F 25/2027* (2013.01); *A01K 5/001* (2013.01);
(Continued)

(58) Field of Classification Search
CPC ....... A01K 5/001; A01K 5/004; A01D 90/105
(Continued)

(56) References Cited

U.S. PATENT DOCUMENTS 5,590,963 A * 1/1997 Schuler ............... B01F 7/00208
366/302
6,945,485 B1 9/2005 Douglas
(Continued)

FOREIGN PATENT DOCUMENTS

CN 203635108 U 6/2014
DE 298 06 252 U1 9/1999
(Continued)

OTHER PUBLICATIONS

European Patent Office International Preliminary Report on Patentability for International Application No. PCT/NL2016/050719, dated Dec. 12, 2017, 6 pages.
(Continued)

*Primary Examiner* — Charles Cooley
(74) *Attorney, Agent, or Firm* — Nixon Peabody LLP

(57) ABSTRACT

The invention provides a mixer feeder (1) comprising a mobile chassis (3), a tub (4) provided on the chassis (3) and at least one auger provided for rotation about a respective vertical axis of rotation. in the tub (4). Seen in vertical cross-section, the wall (12) of the tub (4) extends at least substantially upright from the bottom (6) of the tub (4). The wall (12) of the tub (4) curves inward at the upper side of the tub (4), sloping up and then extending downward.

20 Claims, 3 Drawing Sheets

(51) Int. Cl.
 B01F 13/00 (2006.01)
 B01F 15/00 (2006.01)
 A01F 25/20 (2006.01)
(52) U.S. Cl.
 CPC .......... *B01F 7/245* (2013.01); *B01F 13/0035* (2013.01); *B01F 15/00902* (2013.01); *A01F 2025/2054* (2013.01); *A01F 2025/2063* (2013.01)
(58) Field of Classification Search
 USPC .......................................... 366/347, 603, 606
 See application file for complete search history.

(56) References Cited

U.S. PATENT DOCUMENTS

| | | | |
|---|---|---|---|
| 7,874,720 | B2 | 1/2011 | Hendriks |
| 2009/0296517 | A1 | 12/2009 | Tamminga |
| 2010/0315898 | A1* | 12/2010 | Liet ................. A01K 5/001 366/280 |

FOREIGN PATENT DOCUMENTS

| | | | |
|---|---|---|---|
| DE | 20 2009 008 215 | U1 | 12/2010 |
| EP | 1 042 951 | A1 | 10/2000 |
| EP | 2 901 853 | A1 | 8/2015 |
| EP | 3 364 753 | B1 | 9/2019 |
| WO | WO 03/028891 | A1 | 10/2003 |

OTHER PUBLICATIONS

Siloking, "Siloking Tenchnische Daten 2010: Siloking Duo Avant," Published Nov. 15, 2009 (3 pages).

DAIReXNET, "Managing TMR Variation: Proper Mixing Action for a Vertical Wagon," Web page, <https://www.slideshare.net/DAIReXNET/managing-tmr-variation>, Published online Dec. 5, 2011, Retrieved from Internet Mar. 31, 2020 (1 page).

Strautmann, "Verti-Mix 400/500," Web page, <https://www.strautmann.com/en/verti-mix-40050070>, Published online Dec. 2013, English information on Verti-Mix 400/500 (16 pages).

Supreme International, "Twin Auger Pull Type Mixers," Web page, <http://www.supremeinternational.com/specs/Twin_Auger_Pull_Types.pdf>, Published online May 1, 2015, Retrieved from Internet Jun. 4, 2020 (2 pages).

Schuler, "Multi-Screw Mixers: MS550, MS750," Web page, <http://schulermfg.net/Twin-Auger-Mixer/Schuler_MS550_Ms750.pdf>, Published online Sep. 27, 2015, Retrieved from Internet Jun. 4, 2020 (3 pages).

Bruese, C., "Peecon: Future," Profi Magazin far Professionelle Agrartechnik,.<https://www.profi.de/aktuell/neuheiten/peecon-future-11745929.html>, Published online Nov. 13, 2015, Retrieved from Internet May 12, 2020 (2 pages).

* cited by examiner

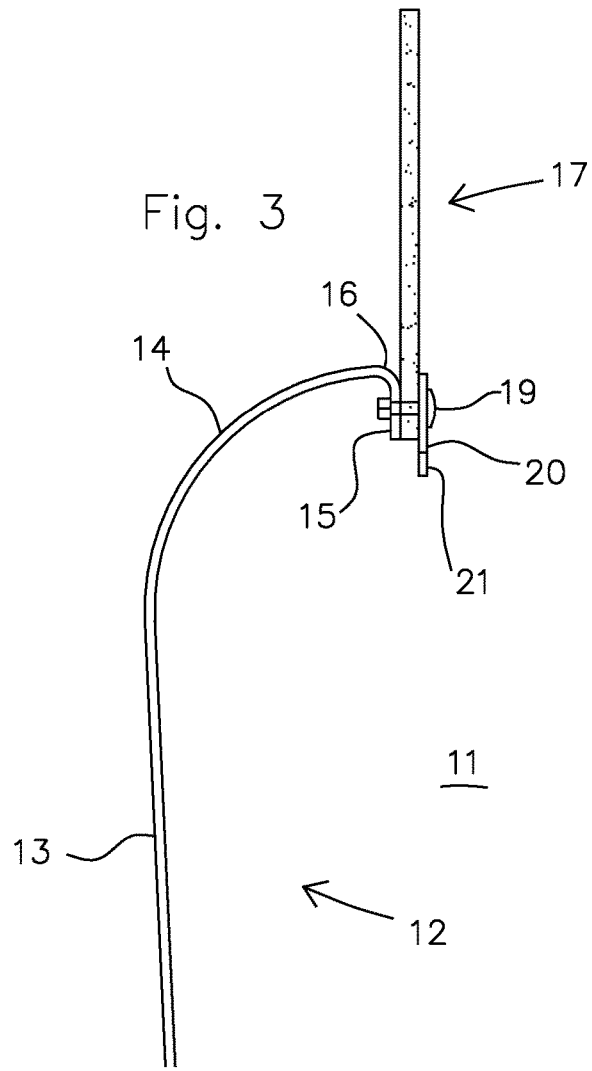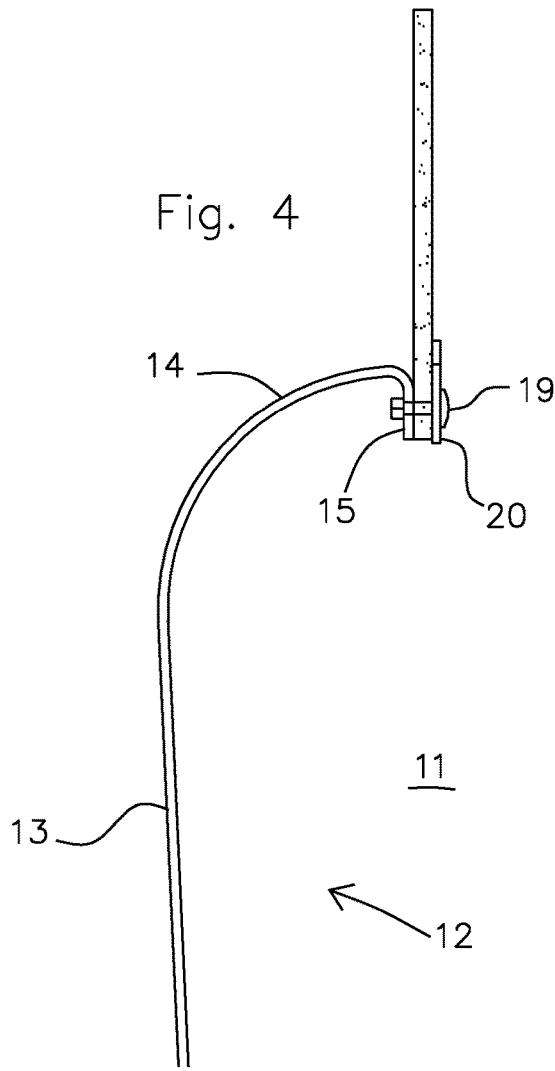

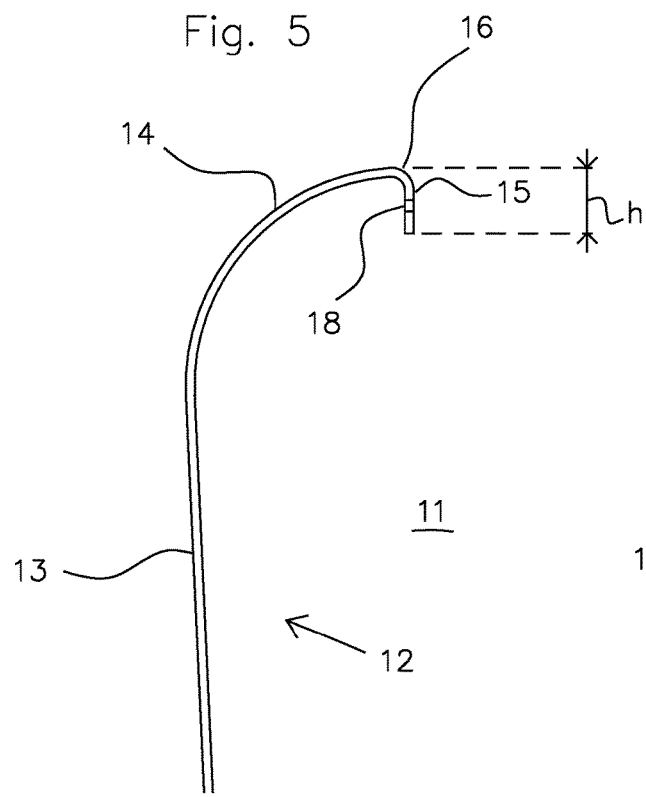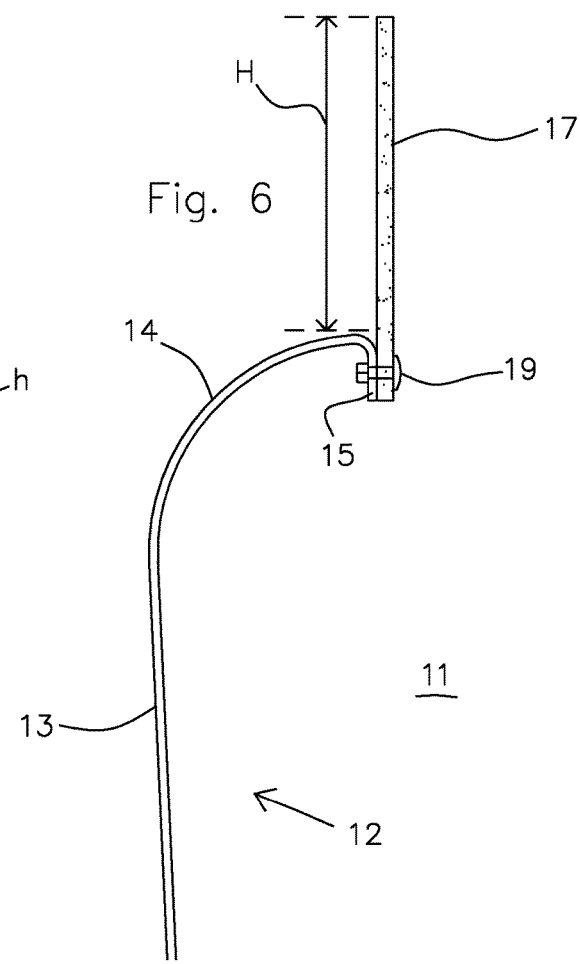

MIXING WAGON

CROSS-REFERENCE TO RELATED APPLICATION

This application is a national stage of Application No. PCT/NL2016/050719 filed Oct. 20, 2016, which claims priority from Netherlands Application No. 2016659 filed Apr. 22, 2016 and Netherlands Application No. 2015654 filed Oct. 23, 2015, which are all incorporated by reference in their entireties.

The present invention relates to a mixer feeder comprising a mobile chassis, a tub provided on the chassis and at least one auger provided for rotation about a respective vertical axis of rotation in the tub, wherein, seen in vertical cross-section, the wall of the tub extends at least substantially upright from the bottom of the tub. Such mixer feeders are known in various embodiments thereof, for example as self-propelled or drawn mixer feeders. To prevent feed from undesirably moving out of the tub via the open upper side thereof during mixing, it is known to provide a tube on the inner side of the endless upper edge of the tube, which tube is welded to the inner side of the tub wall via regularly spaced connecting plates. In practice it has been found that feed remnants frequently remain behind on the upper side of the tub. Such feed remnants can become mouldy and eventually fall in the tub all the same and be mixed with the feed the next time the tub is loaded.

The object of the invention is to provide a mixer feeder as described in the introduction by which the above risk is reduced or even eliminated. In order to achieve that object, the tub wall curves inward at the upper side of the tub, sloping up and then extending downward. On top of the upright portion of the wall, the inward-curved, upward-sloping part and the downwardly extending portion form an upside-down gutter, as it were, thereby reducing the risk of material subjected to the operation of the orders unintentionally moving out of the tub. In addition, the inward-curved, sloping part has the advantage that the risk of material remaining behind on the upper side of the tub is reduced or, practically speaking, even eliminated.

The capacity of the mixer feeder can be increased in a simple manner if the tub is provided with a raised circumferential rim that is fixed to the downwardly extending portion of the tub wall. Such a raised rim can be made of rubber, plastic or steel, for example.

It may be advantageous if the raised rim is fixed to the downwardly extending portion of the tub wall by fastening means. The raised rim can thus be mounted or demounted in a simple manner. A practical example of fastening means of the detachable type are bolt and nuts.

It has been found to be advantageous if the upper side of the raised rim is at least 5 cm higher than the upper side of the upward-sloping part, so that a significant capacity increase of the tub can be realised. On the other hand it is preferable if the raised rim is at most 60 cm lower than the upper side of the upward-sloping part, so that no problems will be encountered upon loading the tub, for example.

It has also been found to be advantageous if the downwardly extending portion of the tub wall has a height of at least 4 cm. In this way overflow of feed from the tub is efficiently prevented, and in addition a sufficiently large surface is created for a raised rim to bear thereagainst. Said height is preferably at most 12 cm so as to limit the use of material for the tub and the weight of the tub.

Preferably, the wall of the tub is curved inward, seen in top view, over the entire circumference of the tub at the upper side thereof, sloping up at the upper side of the tub and then extending downward. The advantages of this specific shape in that case apply over the entire circumference of the tub.

In one embodiment, the tub may be provided with downwardly extending teeth near the downwardly extending portion of the tub wall for reducing feed in the tub.

A constructionally simple embodiment can be obtained if the downwardly extending teeth form part of at least one elongated tooth element that is fixed to the downwardly extending portion of the tub wall, and if the raised rim (if provided) and the tooth element are fixed to the downwardly extending portion of the tub wall with the same fastening means, in particular if the raised rim is clamped between the downwardly extending portion of the tub wall and the tooth element by the fastening means.

Alternatively, the downwardly extending teeth may form part of the downwardly extending portion of the tub wall, with the teeth thus forming a permanent part of the tub wall. It may be decided to mask the teeth in a situation in which the presence of the teeth should not be desirable.

In general it can be stated that, seen in top view, the circumference of the tub preferably has the shape of two opposite curved parts, opposite ends of which are connected via straight parts, wherein the teeth are provided over at least part of the length of the curved parts and wherein the straight parts are free from said teeth over at least part of their length and that, seen in top view, the tub is provided with the teeth over the entire circumference thereof.

It may also be advantageous if, seen in vertical cross-section, at least part of the downwardly extending portion of the wall extends in a straight line. Because of its straight configuration, the downwardly extending portion is quite suitable as a contact surface for fixing the raised rim thereto.

The invention will now be explained in more detail by means of a description of three possible embodiments of a mixer feeder according to the invention, in which reference is made to the following figures:

FIG. 3 is a cross-sectional view of an upper portion of the wall of the tub of the mixer feeder of FIGS. 1 and 2;

FIG. 4 is a cross-sectional view of an alternative embodiment of an upper portion of the wall of the tub of the mixer feeder according to FIGS. 1 and 2;

FIG. 5 shows the upper portion of FIGS. 3 and 4 without the raised rim;

FIG. 6 is a cross-sectional view of another alternative embodiment of an upper portion of the wall of the tub of the mixer feeder of FIGS. 1 and 2.

Figure 1:
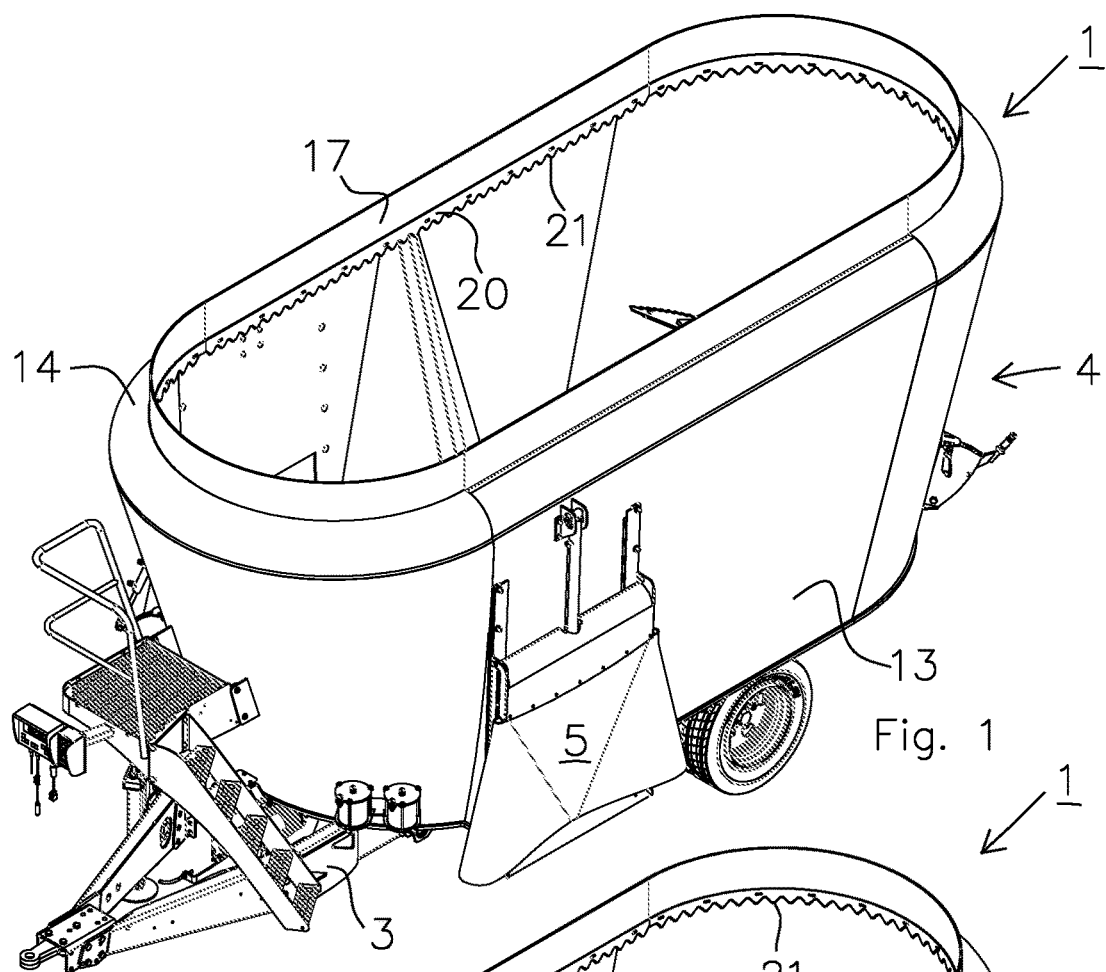
FIGS. 1 and 2 are isometric top views of a mixer feeder according to the invention in combination with a tractor vehicle in a first position of use thereof.
Figure 2:
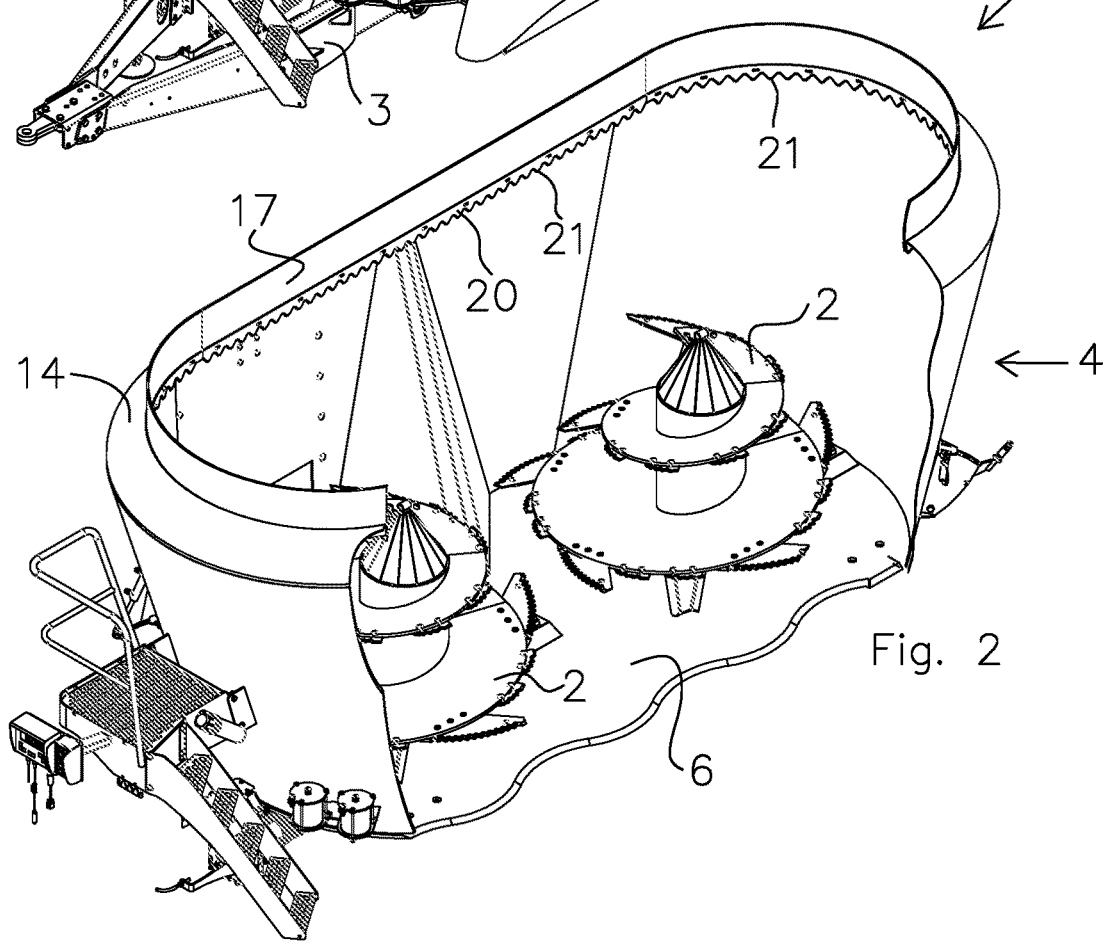

FIGS. 1 and 2 show a mixer feeder 1. The mixer feeder 1 comprises a chassis 3 with a tub 4 mounted thereon. In the tub, two augers 2 are provided, which are each rotatably about a vertical axis of rotation in the tub 4. Provided in the wall of the tub 4 is a door 5. Via this door 5, feed can be supplied to livestock in a shed. Prior thereto, the feed is mixed and cut by the auger. The feed may be silage or mown grass, for example. In particular silage, which, incidentally, may have been made from grass, is usually mixed with supplements comprising additional nutrient substances such as minerals, proteins and/or concentrates. Loading the tub with the feed to be mixed and cut takes place via the open upper side of the tub 4.

FIG. 3 shows in cross-sectional view the upper portion of the wall of the tub 4. The inner side 11 of the tub is located to the right of the wall. The endless wall comprises a number of wall parts 12, for example 4, which are joined together by means of (at least substantially) vertically oriented welded joints and which are each connected to the bottom 6 of the tub 4 by means of horizontal welded joints. Each of the wall parts 12 is flanged inward and downward at the upper side, so that each wall part has an inwardly extending, upward-sloping portion 14 above the slightly outward-sloping main portion 13 of the wall part 12 in question, and a downwardly extending portion 15 which joins said portion 14 via a bend 16. This achieves that the risk of feed remnants remaining behind on the upper side of the tub is reduced or even eliminated. Such forward remnants might become mouldy and eventually fall in the tub 4 all the same and be mixed with the feed when the tub is next loaded. The downwardly extending portion 15, which has a height h (see FIG. 5) of 6 centimetres, further has the advantage that the risk of feed being flung from the tub 4 by the rotating augers 2 is reduced, because feed that is pushed up along the main portion 13 of the wall by the rotating augers 2 is caught, as it were, by the upside-down gutter formed by the portions 14 and 15, and directed downward again.

The downwardly extending portion 15 moreover has the advantage that a raised rim 17 can be fixed thereto in a relatively simple manner, as is shown in FIG. 3, but also in FIGS. 4 and 6. Bores 18 are to that end provided at regular intervals in the downwardly extending portion 15. The raised rim 17, which may be made of metal, rubber or plastic, for example, is detachably connected to the downwardly extending portion 15 by means of bolt and nut connections 19, the bolts of which extend through the bores 18 and also through holes provided in the raised rim 17. A retaining strip 20 is provided the head of the bolt of the bolt and nut connection 19 and the raised rim 17, in which retaining strip bores are provided in the same pattern as the bores 18. The retaining strip 20 reduces the mechanical load on the raised rim in use, which is advantageous in particular if the raised rim 20 is made of rubber or at least a flexible material.

The retaining strip 20 is provided with downwardly extending teeth 21 at the bottom side. In use, said teeth 21 can contribute toward retaining feed within the tub 4 and also toward reducing the feed. Is also possible not to configure the retaining strip 19 with downwardly extending teeth, as a shown in FIG. 4 for the retaining strip 20', which is in fact formed by the retaining strip 20 of FIG. 3, in which the retaining strip is turned upside down, however, so that the teeth face upwards and are actually not functional.

It is also possible not to make use of a retaining strip 20 and to clamp the raised rim 17 directly to the downwardly extending portion 15 using the bolt and nut combination 19, as is shown in FIG. 6.

The raised rim 17 typically projects a distance H of 25 cm from the upper side of the inwardly extending, upward-sloping portion 14. The raised rim 17 may also be connected to the downwardly extending portion by means other than bolt and nut connections 19, for example by means of a welded joint. The use of the raised rim 17 leads to an increased capacity of the tub 4.

The inner side of the wall 12 of the tub may be coated with a wear-resistant coating. An advantageous wear-resistant coating is formed by an epoxy coating, for example a phenol-epoxy coating as for example marketed by the Sigma company under the name of Sigmashield 1200. The use of a wear-resistant coating as suggested above can also be advantageous in the case of conventional mixer feeders, which may or may not be fitted with a tub comprising a wall which is curved inward at the upper side of the tub, sloping up and then extending downward.

The invention claimed is:

1. A mixer feeder comprising:
   a mobile chassis,
   a tub provided on the chassis, and
   at least one auger provided for rotation about a respective vertical axis of rotation in the tub,
   wherein, seen in a top view of the mixer feeder, the tub has opposing semi-circular ends, and
   wherein, seen in a vertical cross-section of the mixed feeder, a wall of the tub extends at least substantially upright from a bottom of the tub, characterised in that the tub wall curves continuously inward at an upper side of the tub over the entire circumference of the tub,
   wherein the inwardly curving tub wall at the upper side of the tub includes an initially upwardly sloping portion and a downwardly extending portion that forms an upside-down gutter for reducing the risk of material subjected to the operation of the at least one auger unintentionally moving out of the tub,
   wherein the downwardly extending portion and the upwardly sloping portion join each other via a bend.

2. The mixer feeder according to claim 1, characterised in that the tub is provided with a raised circumferential rim that is fixed to the downwardly extending portion of the tub wall.

3. The mixer feeder according to claim 1, characterised in that a raised rim is fixed to the downwardly extending portion of the tub wall by fastening means.

4. The mixer feeder according to claim 3, characterised in that bolt and nut connections constitute the fastening means.

5. The mixer feeder according to claim 3, characterised in that an upper side of the raised rim is at least 5 cm higher than an upper side of the upward-sloping part.

6. The mixer feeder according to claim 1, characterised in that bores are provided in the downwardly extending portion of the tub wall.

7. The mixer feeder according to claim 1, characterised in that the downward extending portion of the tub wall extends vertically.

8. The mixer feeder according to claim 1, characterised in that the downwardly extending portion of the tub wall has a height of at least 4 cm.

9. The mixer feeder according to claim 1, characterised in that the tub is provided with downwardly extending teeth near the downwardly extending portion of the tub wall.

10. The mixer feeder according to claim 9, characterised in that the downwardly extending teeth form part of at least one elongated tooth element that is fixed to the downwardly extending portion of the tub wall.

11. The mixer feeder according to claim 3, characterised in that the raised rim and at least one elongated tooth element are fixed to the downwardly extending portion of the tub wall with the same fastening means.

12. The mixer feeder according to claim 11, characterised in that the raised rim is clamped between the downwardly extending portion of the tub wall and the tooth element by the fastening means.

13. The mixer feeder according to claim 9, characterised in that the downwardly extending teeth form part of the downwardly extending portion of the tub wall.

14. The mixer feeder according to claim 9, characterised in that, seen in top view, the circumference of the tub has the shape of two opposite curved parts, opposite ends of which are connected via straight parts, wherein the teeth are provided over at least part of the length of the curved parts and wherein the straight parts are free from said teeth over at least part of their length.

15. The mixer feeder according to claim 9, characterised in that, seen in top view, the tub is provided with the teeth over the entire circumference thereof.

16. The mixer feeder according to claim 1, characterised in that, seen in vertical cross-section, at least part of the downwardly extending portion of the wall extends in a straight line.

17. The mixer feeder according to claim 1, characterised in that the wall of the tub is formed by welding a number of parts together.

18. The mixer feeder according to claim 1, characterised in that the upwardly sloping portion and the downwardly wall of the tub are continuous over the entire circumference of the tub.

19. A mixer feeder comprising:
   a mobile chassis,
   a tub provided on the chassis, and
   at least one auger provided for rotation about a respective vertical axis of rotation in the tub,
   wherein, seen in a top view of the mixer feeder, the tub has opposing semi-circular ends, and
   wherein, seen in a vertical cross-section of the mixed feeder, a wall of the tub extends at least substantially upright from a bottom of the tub, characterised in that the tub wall curves inward at an upper side of the tub,
   wherein the inwardly curving tub wall at the upper side of the tub includes an initially upwardly continuously curved portion and a downwardly extending portion that forms an upside-down gutter for reducing the risk of material subjected to the operation of the at least one auger unintentionally moving out of the tub,
   wherein the downwardly extending portion and the upwardly sloping portion join each other via a curved bend.

20. The mixer feeder according to claim 19, characterised in that the tub is provided with a raised circumferential rim that is fixed to the downwardly extending portion of the tub wall.

* * * * *